United States Patent Office 2,890,948
Patented June 16, 1959

2,890,948

AQUEOUS THERMOSETTING RESIN COMPOSITIONS HAVING IMPROVED VISCOSITY-TEMPERATURE RELATIONSHIPS

Joel Fantl, Springfield, Mass., Frank J. Lection, Pittsburgh, Pa., and Stuart H. Rider, Longmeadow, Mass., assignors to Monsanto Chemical Company, St. Louis, Mo., a corporation of Delaware No Drawing. Application November 16, 1955
Serial No. 547,334

3 Claims. (Cl. 51—298)

The present invention relates to aqueous thermosetting resin compositions having improved viscosity-temperature relationships and to methods for preparing same.

In the manufacture of abrasive-coated papers, e.g., sandpaper, it is customary (1) to coat the backing paper with an aqueous thermosetting resin solution such as a phenolformaldehyde resin solution, a urea-formaldehyde resin solution or a melamine-formaldehyde resin solution, (2) to deposit abrasive grits on the resin coated paper, and (3) to pass the coated paper in festoon through a drying oven which removes water and cures the resin. This manufacturing process places severe demands upon the aqueous thermosetting resin solution employed. The resin solution must be sufficiently fluid at room temperature so that it can be applied easily to the paper. At the same time, the resin solution must be sufficiently viscous at drying temperatures so that the abrasive grits do not slip or slide when the semi-finished sheets are passed through the drying oven in festoon. The problem presented is one of developing aqueous thermosetting resin solutions exhibiting small changes in viscosity with changes in temperature.

It is an object of this invention is to provide improved aqueous thermosetting resin solutions.

Another object of this invention is to provide improved aqueous thermosetting resin solutions exhibiting small changes in viscosity with changes in temperature.

Other objects and advantages of this invention will become apparent from the following detailed description thereof.

It has been discovered that aqueous thermosetting resin solutions having small changes in viscosity with changes in temperature can be prepared by incorporating a small quantity of certain specific polyvinyl alcohols in the thermosetting resin solutions. The polyvinyl alcohols employed have a Brookfield viscosity of at least 250 centipoises, as determined in a 1% solution in water at 20° C., have an acetate content of 15 to 40 weight percent, calculated as polyvinyl acetate, and are prepared by hydrolyzing polyvinyl acetate in the presence of a catalytic quantity of sulfuric acid in a mixed solvent consisting of 3 to 25 weight percent methanol and the balance a hydrocarbon selected from the group consisting of benzene, toluene, xylene and mixtures thereof.

In the following descriptions and claims, reference will be made to the term "index of viscosity change" (IVC). This term is calculated in accordance with the following formula:

$$IVC = \frac{N_1 - N_2}{N_1} \times 100$$

where: $N_1$ is the viscosity of the resin solution at the lower of two temperatures, and $N_2$ is the viscosity of the resin solution at the higher of the two temperatures.

The index of viscosity change is an empirical term which measures the change in viscosity in increasing the temperature of a thermosetting resin solution from a lower temperature to a higher temperature. Although empirical, the term provides a ready tool that may be used in comparing the viscosity-temperature relationships of any series of aqueous thermosetting resin solutions.

The following examples are set forth to illustrate more clearly the principle and practice of this invention to those skilled in the art. All parts are by weight.

EXAMPLE I

Part A

Three aqueous phenol-formaldehyde resins are prepared for use in the following examples.

Resin A is prepared by reacting 100 parts of phenol with 125 parts of formalin (37% formaldehyde) in the presence of 4 parts of 50% NaOH at 70° C. to form a water-soluble resin. The resin solution is then cooled at 40° C., neutralized with phosphoric acid to a pH of 7.5-7.8 and dehydrated to a solids content of 65 weight percent.

Resin B is prepared by reacting 100 parts of phenol with 180 parts of formalin (37% formaldehyde) in the presence of 12 parts of 25% aqueous sodium carbonate at 80° C. The aqueous solution then is dehydrated to an 80 weight percent solids solution.

Resin C is prepared by adding 2.3 parts of a high viscosity polyvinyl alcohol to 97.7 parts of resin A. This corresponds to 3.5 weight percent polyvinyl alcohol on the basis of resin solids. The polyvinyl alcohol employed has a Brookfield viscosity (No. 2 spindle at 30 r.p.m.) of 510 centipoises in a 1% aqueous solution at 20° C. and has an acetate content of 28% calculated as polyvinyl acetate. The polyvinyl alcohol is prepared by hydrolyzing a high-molecular weight polyvinyl acetate in the presence of a catalytic quantity of sulfuric acid in a mixed solvent consisting of about 10 weight percent methanol and the balance toluene.

Part B

Brookfield viscosities (No. 4 spindle at 4 r.p.m.) are run at 25° C. and 90° C. on the three aqueous phenol-formaldehyde resin compositions prepared in Part A above. These data, together with the indexes of viscosity change calculated therefrom, are set forth below in Table I.

TABLE I

| Resin | A | B | C |
|---|---|---|---|
| Viscosity at 25° C., centipoises | 60 | 15,000 | 19,000 |
| Viscosity at 90° C., centipoises | 10 | 2,500 | 5,000 |
| Index of Viscosity Change | 83 | 83 | 74 |

The index of viscosity change values of 83 obtained with resin A and resin B indicate that these resins retain only 17% of their initial viscosity when their temperature is raised from 25° C. to 90° C. In contradistinction to these results, the index of viscosity change value of 74 obtained with resin C indicates that this resin retains 26% of its initial viscosity when its temperature is raised from 25° C. to 90° C.

Similar index of viscosity change values are obtained between these two temperatures when the same polyvinyl alcohol is incorporated in aqueous urea-formaldehyde resin solutions and aqueous melamine-formaldehyde resin solutions.

EXAMPLE II

A test is run to compare the suitability of resin B and resin C of Example I as an abrasive binder. Two panes of glass are coated with, respectively, resin B and resin C and equal quantities of abrasive grits are uniformly distributed on both glass panes. The panes of glass are placed in a vertical position in a 160° F. oven and maintained in this position for ten minutes. The abrasive grits placed on resin B slide approximately six inches, whereas the abrasive grits bonded by resin C slide only about one inch. This test demonstrates the material superiority of the polyvinyl alcohol modified resin solution as an abrasive binder resin.

EXAMPLE III

Three abrasive coated papers are prepared by coating a paper backing with, respectively, resin A, resin B and resin C of Example I, depositing abrasive grits on the three coated papers and drying them in festoon at 150° C. The finished abrasive coated paper prepared from resin C has the abrasive grits uniformly distributed thereon indicating that few if any of the abrasive grits have slid from their original position during the drying operation. In contradistinction to these results, the finished abrasive coated papers prepared from resin A and resin B have a heterogeneous surface indicating that relatively large numbers of the abrasive grits have slid from the original position during the drying operation.

The polyvinyl alcohols incorporated in the aqueous thermosetting resin solutions have Brookfield viscosities of at least 250 centipoises, as determined in 1% aqueous solutions at 20° C., and have acetate contents of 15–40 weight percent calculated as polyvinyl acetate. Such polyvinyl alcohols are prepared by hydrolyzing polyvinyl acetate in the presence of a catalytic quantity of sulfuric acid in a mixed solvent consisting of 3–25 weight percent methanol and the balance a hydrocarbon of the group consisting of benzene, toluene, xylene and mixtures thereof. The preparation of such polyvinyl alcohols is described in detail in U.S. 2,499,924 and that description is incorporated herein by reference.

The quantity of polyvinyl alcohol incorporated in the aqueous thermosetting resin solution is a minor one, but sufficient to reduce the index of viscosity change of the resin solution in which it is incorporated. Ordinarily, the polyvinyl alcohol will be incorporated in an amount constituting 1–10 weight percent and preferably 2–5 weight percent of the resin solids.

A reduction in index of viscosity change is obtained by incorporating the previously described polyvinyl alcohols in essentially any aqueous solution of a phenol-formaldehyde resin, a urea-formaldehyde resin or a melamine-formaldehyde resin. As used herein, the term "solution" is also intended to include within its scope colloidal dispersions. In general, such aqueous resin solutions will be partially polymerized one-stage resins, i.e., resins in which formaldehyde is present in molar excess of the phenol, urea or melamine. When a phenol-formaldehyde resin is employed, such a resin will ordinarily contain phenol itself as the phenolic constituent of the resin, although homologues thereof such as cresol and xylenol also may be employed. In urea-formaldehyde resins, thiourea also may be employed in lieu of or as a partial replacement for urea.

The above descriptions and examples are set forth by way of illustration only. It will be obvious to those skilled in the art that many variations and modifications thereof can be made without departing from the spirit and scope of the invention herein disclosed.

What is claimed is:

1. An aqueous solution of 95–98 parts by weight of a thermosetting resin selected from the group consisting of phenol-formaldehyde resins, urea-formaldehyde resins and melamine-formaldehyde resins and, correspondingly, 5–2 parts by weight of a polyvinyl alcohol having a Brookfield viscosity of at least 250 centipoises, as determined in a 1% aqueous solution at 20° C., and having an acetate content of 15–40 weight percent, calculated as polyvinyl acetate; said polyvinyl alcohol having been prepared by hydrolyzing polyvinyl acetate in the presence of a catalytic quantity of sulfuric acid in a mixed solvent consisting of 3–25 weight percent methanol and the balance a hydrocarbon selected from the group consisting of benzene, toluene, xylene and mixtures thereof.

2. The compositions of claim 1 in which the thermosetting resin solution employed is a condensation product of phenol and formaldehyde.

3. In a process for the manufacture of abrasive coated papers in which (1) a backing paper is coated with an aqueous solution of a thermosetting resin of the class consisting of phenol-formaldehyde resins, urea-formaldehyde resins and melamine-formaldehyde resins, (2) abrasive grits are deposited upon the resin coated paper and (3) said abrasive grit carrying paper is dried in festoon; the improvement which comprises incorporating 2–5 parts, per 100 parts of resin solids, of a polyvinyl alcohol in the aqueous thermosetting resin solution employed, said polyvinyl alcohol having a Brookfield viscosity of at least 250 centipoises, as determined in a 1% aqueous solution at 20° C., and having an acetate content of 15–40 weight percent, calculated as polyvinyl acetate; said polyvinyl alcohol having been prepared by hydrolyzing polyvinyl acetate in the presence of a catalytic quantity of sulfuric acid in a mixed solvent consisting of 3–25 weight percent methanol and the balance a hydrocarbon selected from the group consisting of benzene, toluene, xylene and mixtures thereof.

References Cited in the file of this patent

UNITED STATES PATENTS

| | | |
|---|---|---|
| 2,111,006 | Robie | Mar. 15, 1938 |
| 2,111,272 | Paulson | Mar. 15, 1938 |
| 2,251,437 | Brown | Aug. 5, 1941 |
| 2,499,924 | Lavin | Mar. 7, 1950 |